(12) United States Patent
Takahashi et al.

(10) Patent No.: US 7,054,523 B2
(45) Date of Patent: May 30, 2006

(54) OPTICAL WAVEGUIDE MEMBER AND OPTICAL MODULE

(75) Inventors: Makoto Takahashi, Kokubunji (JP); Tatemi Ido, Kodaira (JP); Tooru Takahashi, Tsukuba (JP)

(73) Assignees: Hitachi, Ltd., Tokyo (JP); Hitachi Chemical Co., Ltd., Tokyo (JP)

( * ) Notice: Subject to any disclaimer, the term of this patent is extended or adjusted under 35 U.S.C. 154(b) by 54 days.

(21) Appl. No.: 10/250,506

(22) PCT Filed: Feb. 27, 2002

(86) PCT No.: PCT/JP02/01766

§ 371 (c)(1),
(2), (4) Date: Jul. 3, 2003

(87) PCT Pub. No.: WO03/036346

PCT Pub. Date: May 1, 2003

(65) Prior Publication Data

US 2004/0076359 A1    Apr. 22, 2004

(30) Foreign Application Priority Data

Oct. 24, 2001    (JP) .............................. 2001-326230

(51) Int. Cl.
*G02B 6/26* (2006.01)
*G02B 6/42* (2006.01)

(52) U.S. Cl. ..................... 385/28; 385/14; 385/15; 385/49; 385/50; 385/129; 385/130; 385/131; 385/132; 385/143; 385/145

(58) Field of Classification Search ............... 385/14, 385/15, 28, 49, 50, 129–132, 143, 145
See application file for complete search history.

(56) References Cited

U.S. PATENT DOCUMENTS

| 4,087,159 A | 5/1978 | Ulrich |
| 4,950,045 A | 8/1990 | Bricheno et al. |
| 5,379,354 A | 1/1995 | Jenkins |
| 5,640,474 A * | 6/1997 | Tayag .......................... 385/43 |

(Continued)

FOREIGN PATENT DOCUMENTS

DE    24 45 150    4/1975

(Continued)

OTHER PUBLICATIONS

Applied Physical Letters 61, (15), Oct. 12, 1992, Novel 1-to-N integrated optical beam splitters using symmetric mode mixing in GaAs/AlGaAs multimode waveguidesl, J.M. Heaton et al, pp. 1754-1756.*

(Continued)

*Primary Examiner*—Kaveh Kianni
*Assistant Examiner*—Jerry Martin Blevins
(74) *Attorney, Agent, or Firm*—Mattingly, Stanger, Malui & Brundidge, P.C.

(57) ABSTRACT

The present invention has an object of enhancing the tolerance of setup positioning error of an optical multiplexer/demultiplexer which uses a multi-mode optical waveguide. For this sake, the invention is designed to couple the multi-mode optical waveguide with a single-mode optical waveguide directly. In another configuration of this invention, there is provided between both optical waveguides a single-mode optical waveguide having its length set to be approximately equal to zero, or equal or approximately equal to the period of interference between the 0th-order mode and a radiative higher-order mode of the single-mode optical waveguide.

20 Claims, 10 Drawing Sheets

U.S. PATENT DOCUMENTS

| | | |
|---|---|---|
| 5,790,729 A | 8/1998 | Pologe et al. |
| 5,949,931 A * | 9/1999 | Kitamura ..................... 385/28 |
| 6,236,784 B1 | 5/2001 | Ido |
| 6,436,613 B1 * | 8/2002 | Fallahi et al. ............... 430/321 |

FOREIGN PATENT DOCUMENTS

| | | |
|---|---|---|
| DE | 39 23 185 | 7/1989 |
| EP | 0 801 316 | 10/1997 |
| FR | 2 285 623 | 9/1975 |
| FR | 2 634 288 | 7/1989 |
| GB | 1 525 492 | 9/1975 |
| GB | 2 220 764 | 1/1990 |
| JP | 51-57457 | 5/1976 |
| JP | 01-156703 | 6/1989 |
| JP | 03-171115 | 7/1991 |
| JP | 06-503899 | 4/1994 |
| JP | 06-138335 * | 5/1994 |
| JP | 06-317723 | 11/1994 |
| JP | 10-039164 | 2/1998 |
| JP | 10-48458 | 2/1998 |
| JP | 2000-121857 | 4/2000 |
| WO | 92/11554 | 7/1992 |

OTHER PUBLICATIONS

Applied Physical Letters 61, (15), Oct. 12, 1992, "Novel 1-to-N integrated optical beam splitters using symmetric mode mixing in GaAs/AlGaAs multimode waveguidesl", J.M. Heaton et al, pp. 1754-1756.

H. Takahashi et al, Integrated-Optic 1 X 128 Power Splitter with Multifunnel Waveguide IEEE Photonics Technology Letters, vol. 5, No. 1, Jan. 1993, pp. 58-60.

"Optical Multi-Mode Interference Devices Based on Self-Imaging: Principles and Applications", Lucas B. Soldano et al., Journal of Lightwave Technology, vol. 13, No. 4, Apr. 1995, pp. 615-627.

* cited by examiner

OPTICAL WAVEGUIDE MEMBER AND OPTICAL MODULE

TECHNICAL FIELD

The present invention relates to an optical waveguide member and an optical module, and particularly to an optical multiplexer/demultiplexer and an optical module using the same.

BACKGROUND ART

Attention is paid to the wavelength division multiplexing (WDM) system from the viewpoint of enhanced speed and capacity of optical communication. The optical multiplexer/demultiplexer is indispensable device for the WDM system. The devices in the type used by being coupled with a single-mode fiber are particularly crucial. The reason is that using a single-mode fiber can transmit optical signals at less deterioration of signal waveform.

As a conventional device, there is known an optical demultiplexer described in publication: Applied Physics Letter, Vol. 61, No. 15, pp. 1754–1756, published in 1992, for example.

Figure 13:
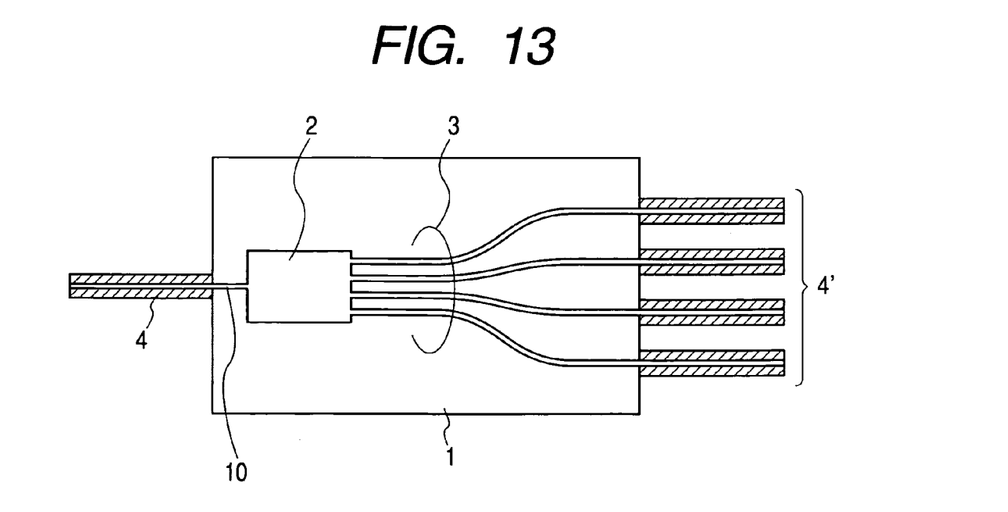
FIG. 13 is a plan view showing a conventional example.

FIG. 13 is a plan view of a typical example of the device. This device is made up of a single-mode waveguide 10 of one core, a multi-mode waveguide 2, and a single-mode waveguide array 3 of four cores, with all parts being coupled to series in the optical axis direction on a substrate 1. When the device is used as demultiplexer, a single-mode fiber 4 is coupled to the 1-core side and a light is put in to the single-mode waveguide 10. The light excites in multiple modes at incidence to the multi-mode waveguide 2 and branches to four ways due to the interference among the modes, and then is conducted from the single-mode waveguide array 3 to 4-core single-mode fibers 4'.

Figure 14:
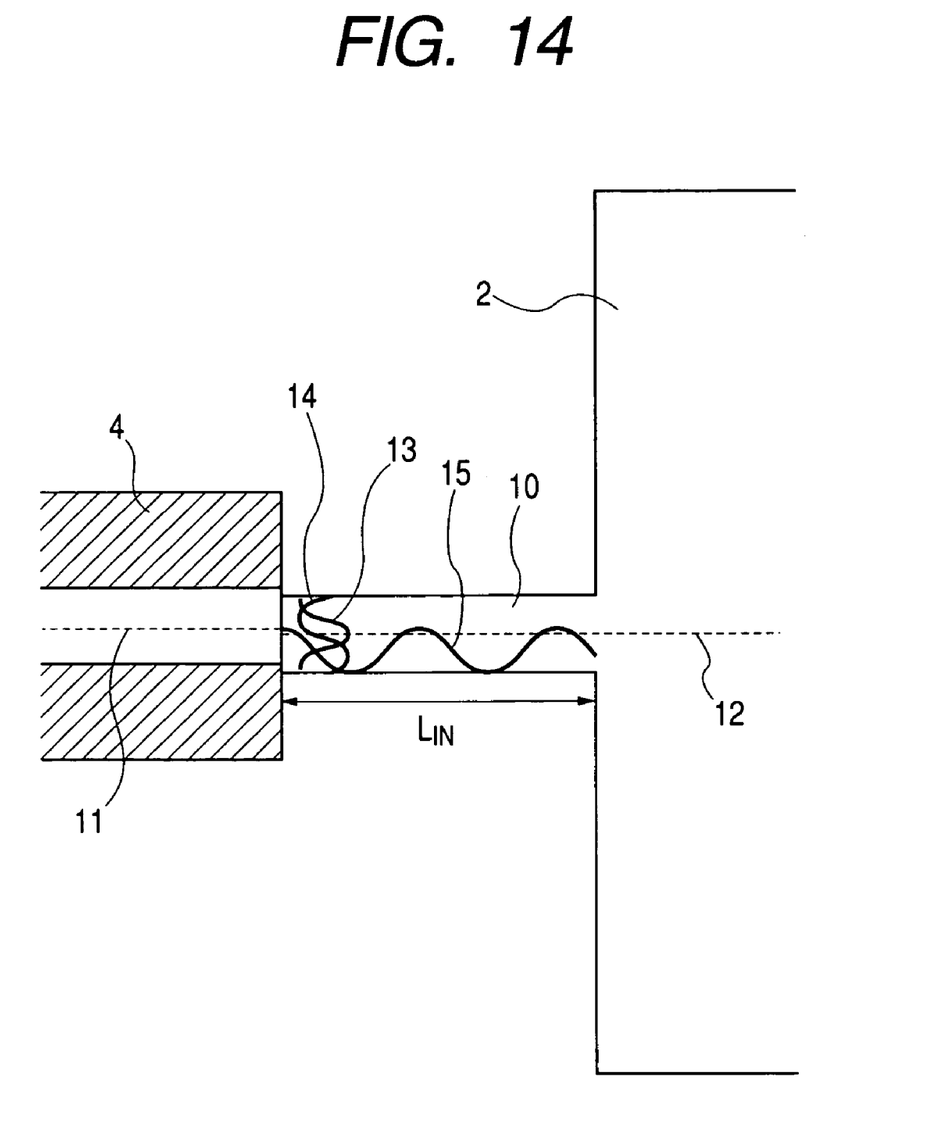
FIG. 14 is a plan view showing the propagation of light in the conventional arrangement.

The above-said conventional device has its single-mode waveguide 10 located between the 1-core single-mode fiber 4 and the multi-mode waveguide 2, so that the light is incident to the center of the multi-mode waveguide 2. In this case, however, if there is misalignment between the single-mode fiber 4 and the device on its 1-core side, a radiative light 14 of a higher-order mode excites in the single-mode waveguide 10. This higher-order mode light 14 interferes with the 0th-order mode light 13. Due to the fluctuation of light distribution during the propagation, even a small misalignment can cause the incident light going into the multi-mode waveguide 2 to deviate greatly in position and direction from the center axis. FIG. 14 shows the relation in this event among the center axis 11 of the single-mode fiber 4, the center axis 12 of the single-mode waveguide 10, and the peak positions 15 of the light intensity. Other portions of this figure are referred to by the same symbols as those of FIG. 13. There arises a significant inequality in light output among the channels. Therefore, high positioning accuracy is required in setting up the device, and it is difficult to lower the setup cost based on a simple passive alignment method.

In view of the foregoing situation, it is an object of the present invention to provide an optical multiplexer/demultiplexer which has large tolerance of setup positioning error against the single-mode fiber and allows modular setup based on a low cost simple passive alignment method.

Japanese Patent Laid-Open No.H10 (1998)-48458 describes an example directly coupling of a multi-mode fiber to a multi-mode waveguide. However, this patent publication pertains solely to a technique of the use of a multi-mode fiber.

DISCLOSURE OF THE INVENTION

A representative from of this invention is characterized by coupling optically a multi-mode waveguide 2 and a 1-core single-mode fiber 4 directly. The inventive optical waveguide member can be used either as optical multiplexer or as optical demultiplexer. Depending on as to whether the optical waveguide member is used as optical multiplexer or used as optical demultiplexer, it is different in light input direction. The inventive optical waveguide member can have the attachment of an optical device or optical elements at the input port or output port depending on the purpose.

The invention resides in an optical waveguide member which is characterized by comprising, at least, a multi-mode optical waveguide and a plurality of single-mode optical waveguides which are coupled optically to a first end face of the multi-mode optical waveguide, the multi-mode optical waveguide being adapted to couple optically on its second end face, which is opposite to the first end face, with a single-mode fiber.

It is significant for the inventive device to have the setting of the length of the single-mode optical waveguide which is coupled optically to the second end face of the multi-mode optical waveguide. The manner of setting will be explained in detail later.

Figure 15:
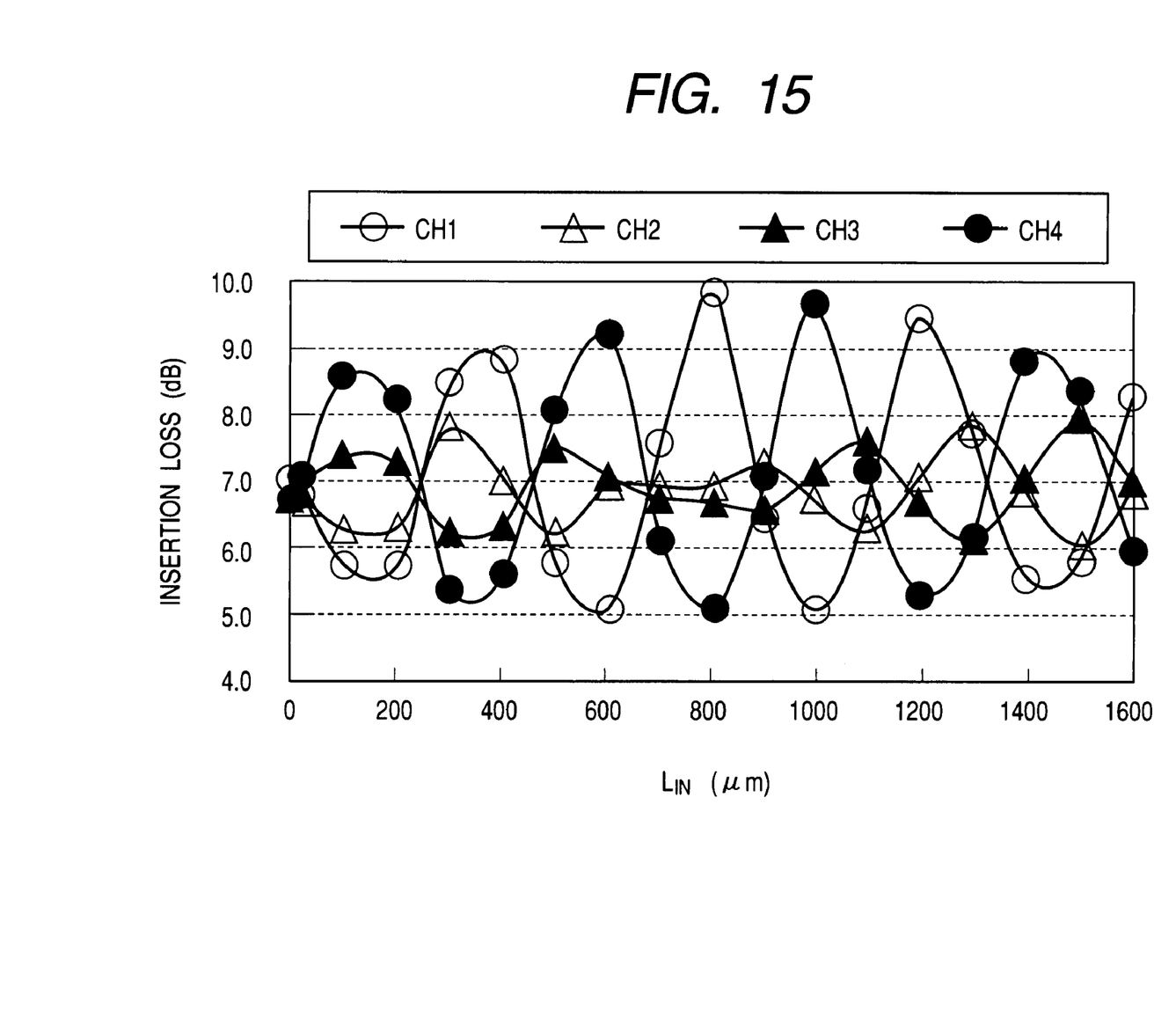
FIG. 15 is a graph showing an example of the relation between the length of single-mode waveguide in the 1-core side and the insertion loss.

For the explanation of the principle of this invention, the relation between the length of 1-core single-mode waveguide and the insertion loss will be exemplified. FIG. 15 shows a calculation result of the relation between the length $L_{IN}$ of 1-core single-mode waveguide and the insertion loss of the case of misalignment of 1.0 μm in the horizontal direction existing between the optical demultiplexer having a single-mode waveguide and the 1-core single-mode fiber 4. The calculation is based on the beam propagation method. The insertion loss signifies the optical loss attributable to the insertion of the inventive optical waveguide member on the light path.

FIG. 15 also shows the characteristics inherent to the typical device structure of this invention, i.e., $L_{IN}$=0. Channels CH1 through CH4 represent the characteristics of the 4-core single-mode optical waveguide. In this example, the outer single-mode optical waveguides CH1 and CH4 are larger in insertion loss relative to other waveguides CH2 and CH3. On the other hand, the characteristic graph reveals that the inequality of insertion loss among the channels becomes very small at certain intervals of length. The inventive device adopts a structure without a 1-core single-mode optical waveguide or a structure with a 1-core single-mode optical waveguide having such a waveguide length that the inequality of characteristics among the channels is very small. It is appreciated that the inventive device structure can reduce the inequality of insertion loss among the channels, which is attributable to the positioning error in the horizontal direction between the optical demultiplexer having a single-mode waveguide and the 1-core single-mode fiber 4, by about 5 dB from the worst-case value of the conventional device. It is most desirable to couple optically the multi-mode waveguide 2 and the 1-core single-mode fiber 4 directly, as mentioned previously, which should be also affirmative from the viewpoints of performance and manufacturing.

The following explains the period of intervals at which the inequality of optical waveguide characteristics is minimal and various forms of this invention.

As shown in FIG. 15, there are lengths $L_{IN}$ in a period of intervals of 200–250 μm at which the inequality of insertion loss among the channels virtually vanishes, besides the case where the length $L_{IN}$ of 1-core single-mode waveguide is zero. This period is the beat length of interference between the 0th-order mode 13 and radiative higher-order mode 14 as shown in FIG. 14, and it is equal to a value which is the value of π divided by the difference of propagation constants of both modes.

Accordingly, the inventive device may have its length $L_{IN}$ set to be an n-fold (n=0, 1, 2, . . . ) period of interference. This design scheme of an optical multiplexer/demultiplexer of the multi-mode interference (MMI) type implies the comprehension of the radiation mode in contrast to the conventional scheme which merely considers the waveguide mode.

As a result of interference, the insertion loss among the channels varies with the length $L_{IN}$ periodically in a fashion of trigonometric function. On this account, even if the value of $L_{IN}$ is different slightly from an n-fold value of interference period, the inequality of insertion loss among the channels can be minimized, whereby the intended characteristic can be attained.

Specifically, even with $L_{IN}$ set within ⅕ of interference period, the object of this invention can be achieved adequately. In other words, $L_{IN}$ can be said virtually to be within ±40 μm. According to this condition, the device is sufficiently applicable to modules which are intended for the 10 Gb Ethernet for example.

Furthermore, $L_{IN}$ can be set within a range from an n−⅕ fold (n=0,1,2, . . . ) interference period to an n+⅕ fold interference period. In other words, $L_{IN}$ can range within from ±40 μm to an n-fold (n=0,1,2, . . . ) value of interference period. Even in this case, the inequality of insertion loss among the channels can be reduced by about 3 dB from the worst-case value of the conventional device.

More preferably, $L_{IN}$ is set in a range within 1/10 of the interference period. In other words, more preferably, $L_{IN}$ is set within 20 μm.

Alternatively, the same effect can be attained by setting $L_{IN}$ in a range from an n−1/10 fold (n=0,1,2, . . . ) interference period to an n+1/10 fold interference period. In other words, more preferably, $L_{IN}$ is made to range from an n-fold (n=0,1,2, . . . ) value of interference period to ±20 μm. In this case, the inequality of insertion loss among the channels can be expected to decrease by nearly 4 dB relative to the worst-case value of the conventional device.

Although the foregoing explanation is of the odd-numbered order of a higher mode 14 which interferes with the 0th-order mode 13, the interference period of the case of an even-numbered order is obtained as a value which is the value of 2π divided by the difference of propagation constants between the 0th-order mode 13 and a higher-order mode 14.

In practicing this invention, it is optically desirable to have the coincidence between the center axis of the multi-mode waveguide and the center axis of the single-mode waveguide which is coupled optically to the second end face of the multi-mode waveguide. This configuration is common among the variant forms of this invention.

Although the foregoing explanation deals with the optical demultiplexer to exemplify the inventive optical waveguide member, the optical multiplexer and demultiplexer have the same principle of operation, with only difference being their opposite light propagation directions. Therefore, the inventive device when used as an optical multiplexer can secure a large tolerance of setup positioning error as in the case of the optical demultiplexer.

This invention is significant in terms of enabling the enhancement of the tolerance of setup positioning error of optical demultiplexer based on direct coupling of the single-mode fiber to the multi-mode waveguide.

PREFERRED MODE FOR CARRYING OUT THE INVENTION

The embodiments of this invention will be described.

Figure 1:
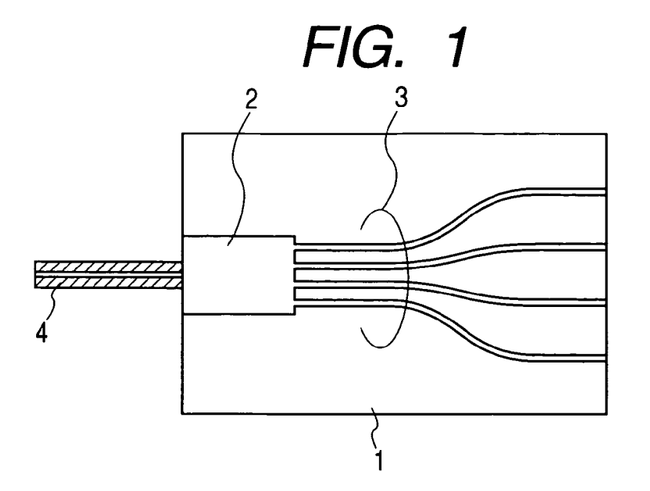
FIG. 1 is a plan view showing a first embodiment of this invention.

FIG. 1 shows the first embodiment of this invention. The figure is a brief top view of the device. The device of this embodiment can be used as optical multiplexer and also as optical demultiplexer. In this embodiment, a multi-mode waveguide 2 and a 4-core single-mode waveguide array 3 are coupled optically on a substrate 1. The multi-mode waveguide 2 has its another end face, which does not couple to the single-mode waveguide array 3, coupled optically with a single-mode fiber 4 directly. On this account, this structure can minimize the inequality of insertion loss among the channels even in the presence of a positioning error between the multi-mode waveguide 2 and the single-mode fiber 4 as described previously. It is significant, as shown in this embodiment, to couple the single-mode fiber directly to the multi-mode waveguide.

Figure 2:
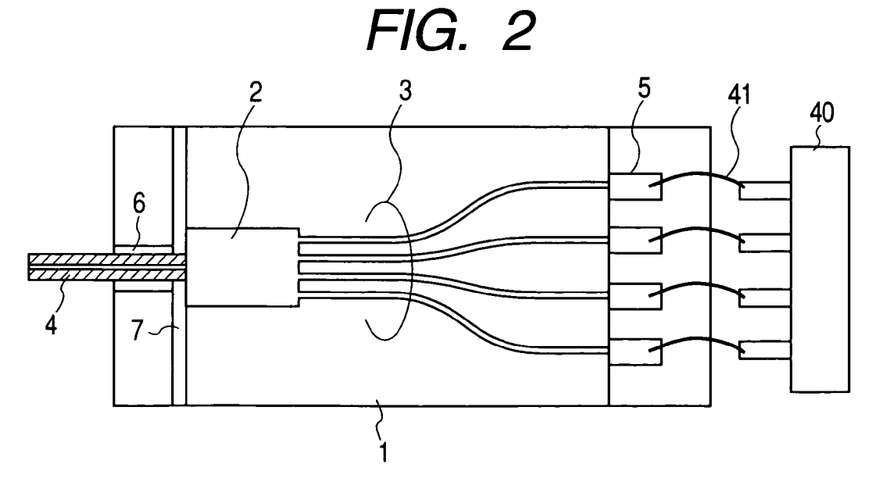
FIG. 2 is a plan view showing a second embodiment of this invention.

FIG. 2 shows the second embodiment of this invention. The figure is a brief top view of the device. This embodiment is an example of optical transmission module. Also in this embodiment, as in the first embodiment, a multi-mode waveguide 2 and a 4-core single-mode waveguide array 3 are coupled optically on a substrate 1. The multi-mode waveguide 2 has its another end face, which does not couple with the single-mode waveguide array 3, coupled optically with a single-mode fiber 4 directly. This module has a V-groove 6 formed in the substrate 1, which is identical to that of the device of the first embodiment, thereby positioning and fixing the single-mode fiber 4 on the substrate 1. The V-groove 6 is formed along the axial direction of the optical fiber. The substrate 1 is, in general, a silicon substrate for example. The V-groove, i.e., a groove with a V-shaped cross section, is formed precisely by anisotropic etching of crystalline silicon. The groove structure of crystalline silicon formed by anisotropic etching is usually called "V-groove". In practice, however, there can be U shapes besides the exact V shape and variations of these shapes. The term "V-groove" or "V-shape groove" used in this document of patent application comprehends all of these shapes of groove. Substrates themselves having the V-shape groove structure are known in the art, and detailed explanation thereof is omitted. There can be other means for this purpose obviously.

In addition, the inventive device has the formation of a dicing groove 7 for rectifying the end face of the V-groove 6. There are four semiconductor lasers 5 of the distributed feedback (DFB) type having different oscillation wavelengths mounted on the substrate 1, which are coupled optically with the single-mode waveguide array 3. The DFB semiconductor lasers 5 are driven by being connected to a transmission LSI 40 through wiring lines 41. This module is capable of multiplexing lights of different wavelengths generated by the four DFB semiconductor lasers 5 and conducting to the single-mode fiber 4 at a small loss and a small inequality of loss among the channels. The module is also operative as a reception module by replacing the DFB semiconductor lasers with photodiodes of the waveguide type and replacing the transmission LSI with a reception LSI. The module has large tolerance of setup positioning error in regard to the inequality of insertion loss among the channels. It is significant also in this embodiment to couple the single-mode fiber 4 directly to the multi-mode waveguide 2 as described previously.

Figure 3:
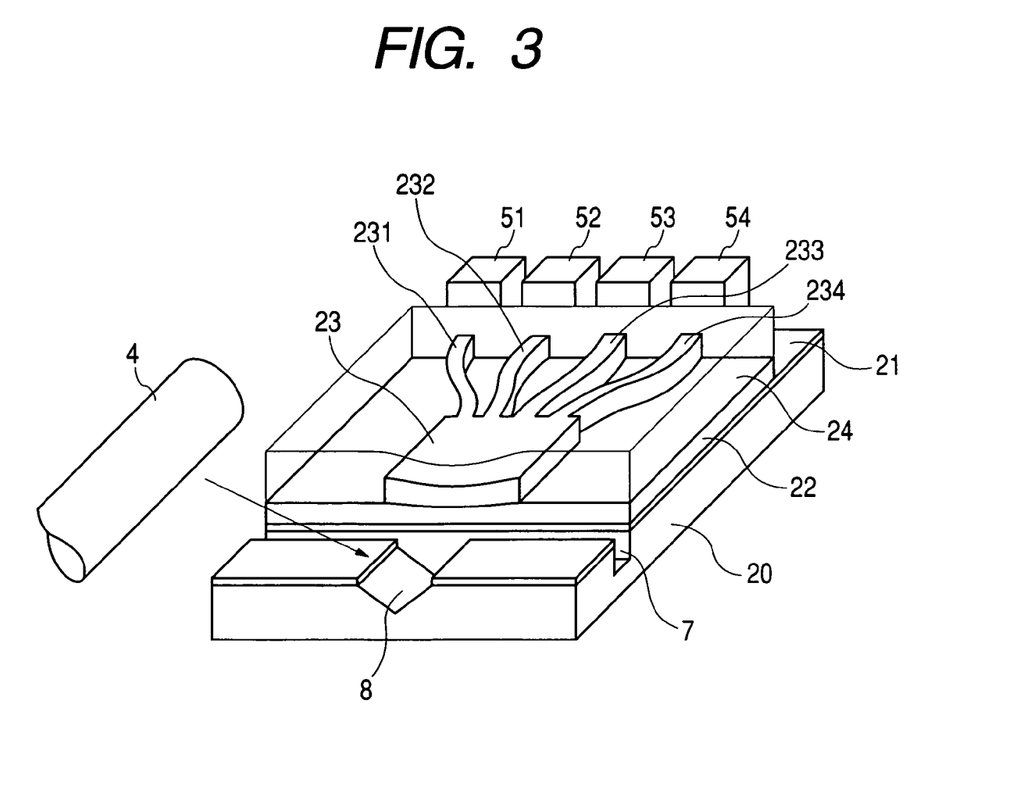
FIG. 3 is a perspective view showing one configuration the second embodiment of this invention.

FIG. 3 shows by perspective view an example of fabrication of the preceding second embodiment by use of a Si substrate and a polymer waveguide. The portion of LSI is not shown in the figure. In this module, the multi-mode waveguide 2 and single-mode waveguide array 3 shown in FIG. 2 are formed of a lower clad layer made of polymer (will be termed "lower polymer clad layer") 22, a core layer made of polymer (will be termed "polymer core layer") 23, and an upper clad layer made of polymer (will be termed "upper polymer clad layer") 24. This polymer waveguide is formed on a Si substrate 20 which is coated on its surface with a silicon dioxide film (will be termed "SiO$_2$ film") 21. The rest is identical to the second embodiment. Specifically, the optical fiber 4 is fitted by being positioned on the V-groove 6. A dicing groove 7 is formed to rectify the end face of the V-groove 6. Four-core single-mode waveguides 231,232,233 and 234 are connected to DFB semiconductor lasers 51,52,53 and 54, respectively.

The module fabricated as described above attained the tolerance characteristic of positioning error of 1.0 μm or more against the single-mode fiber 4. Namely, the inequality among the channels is 0.5 dB or less. This example is for an operational wavelength band of 1.3 m.

Figure 4:
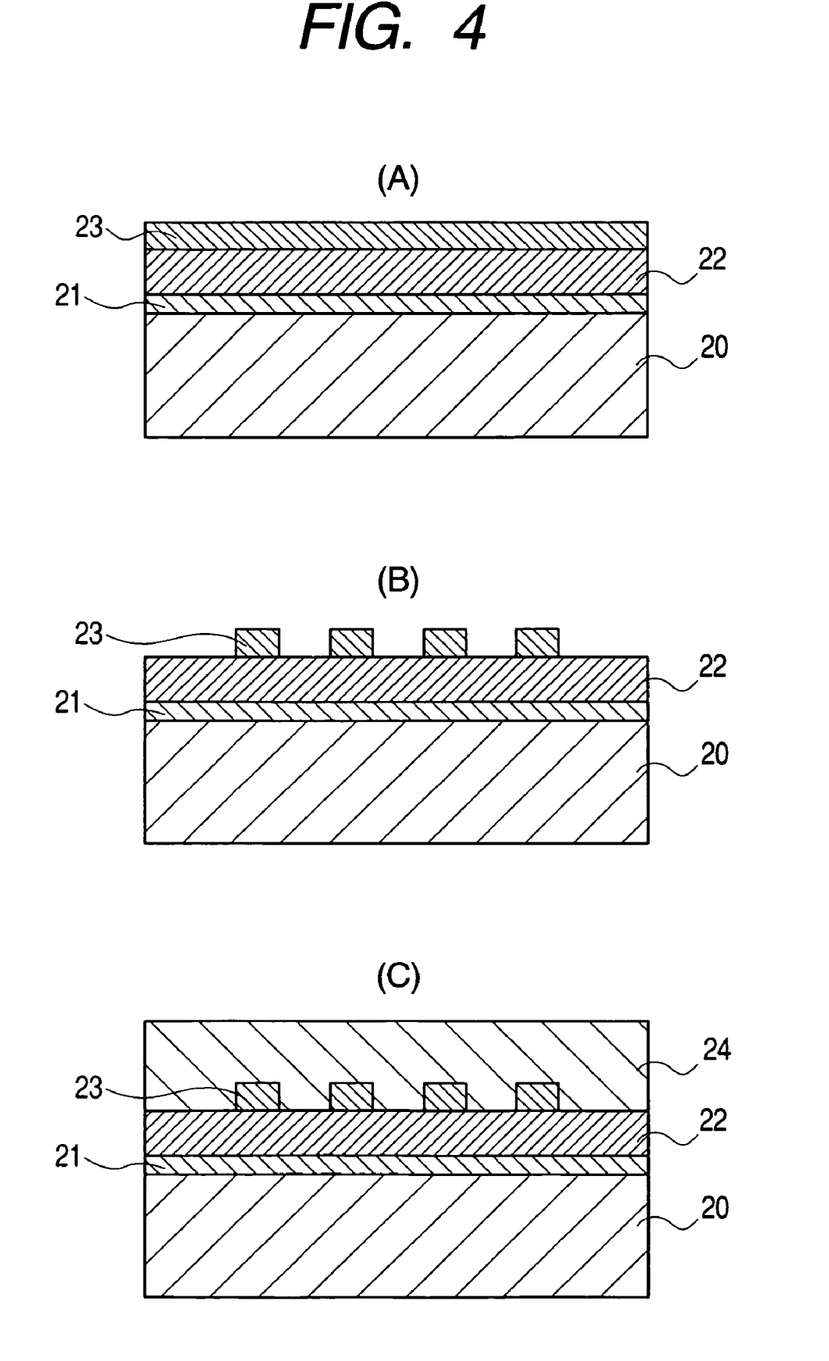
FIGS. 4A to 4C are partial cross-sectional diagrams showing the fabrication steps of the polymer optical waveguide section of the second embodiment of this invention.

FIG. 4 shows the fabrication process of the optical waveguide section of the module described above. The usual fabrication process suffices to make it. FIGS. 4A to 4C are cross-sectional diagrams of the principal portion of the waveguide, showing the sequential steps of fabrication process.

For fabricating the optical waveguide, a Si substrate 20 on which an SiO$_2$ film 21 is formed is prepared, and a lower polymer clad layer 22 and polymer core layer 23 are formed on the SiO$_2$ film 21: (shown in FIG. 4A). Next, the polymer core layer 23 is etched to leave portions in correspondence to the 4-core single-mode waveguides 231,232,233 and 234: (shown in FIG. 4B) On the resulting substrate, an upper polymer clad layer 24 is formed, and a polymer optical waveguide is completed:(shown in FIG. 4C). Typical polymer materials used in fabrication include polyimide, polysiloxane, epoxy resin, acrylate resin, and fluorinated polymers of these resins.

The V-groove 6 of the silicon substrate 20 of the module can be formed by the anisotropic wet etching process which uses KOH solution for example.

In regard to the property of module for specific applications, the dimensions of optical waveguide core are about 6.5 μm by 6.5 μm, the refractivity of clad is about 1.525, the difference of refractivity between the clad and the core is around 0.4%–0.5%, for example. The wavelength band used by this optical module is about from 1250 nm to 1375 nm for example. Generally, four center wavelengths of 1257.7 nm, 1300.2 nm, 1324.7 nm and 1349.2 nm are used for the 10 GbE-WWDM.

Although the foregoing explanation is of the case of use of DFB-type semiconductor lasers or waveguide-type photodiodes, semiconductor lasers or photodiodes of other types or other optical elements can be used depending on the requirement of individual optical systems.

Figure 5:
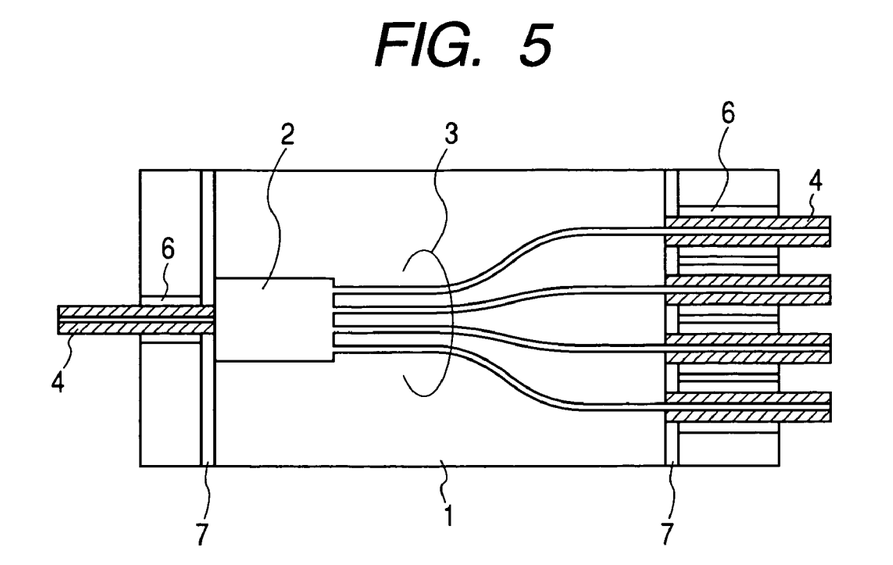
FIG. 5 is a plan view showing a third embodiment of this invention.

FIG. 5 shows the third embodiment of this invention. This embodiment is an example which is derived from the second embodiment, with single-mode fibers 4, in place of the DFB semiconductor lasers 5, being coupled optically to the single-mode waveguide array 3. The rest is identical to the preceding embodiments, and detailed explanation is omitted. This embodiment can be used as optical multiplexer or also as optical demultiplexer. Moreover, in this embodiment, all or part of the optical fibers which are coupled optically to the single-mode waveguide array 3 may be replaced with multi-mode fibers. In this case, this embodiment can be operated as optical demultiplexer.

Figure 6:
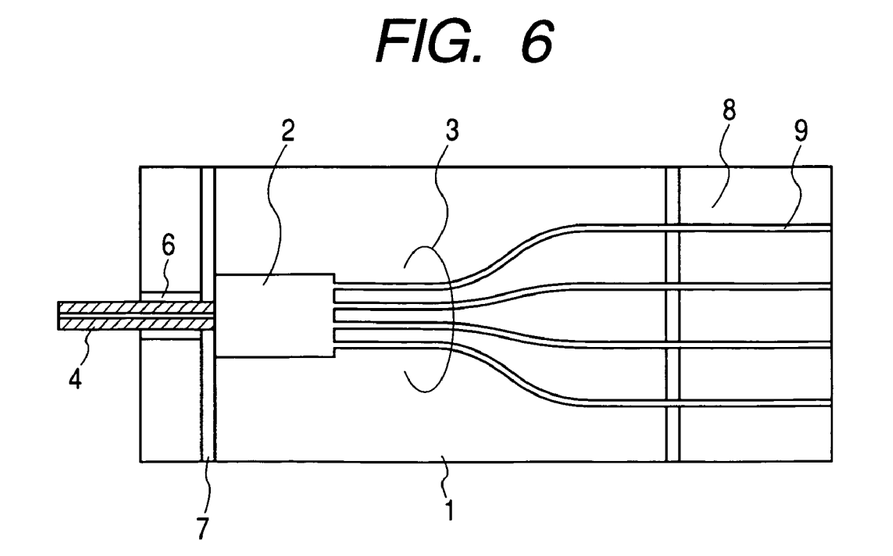
FIG. 6 is a plan view showing a fourth embodiment of this invention.

FIG. 6 shows the fourth embodiment of this invention. The device of this embodiment is an example in which the substrate of optical module is formed of multiple parts. Specifically, this example employs a second substrate 8 which is separate from the substrate 1 on which the multi-mode waveguide 2 and single-mode waveguide array 3 are formed. Formed on the second substrate 8 is a second single-mode waveguide array 9. The rest is identical to the embodiment of FIG. 5.

This embodiment is an example which is derived from the second embodiment, with the second single-mode waveguide array 9, in place of the DFB semiconductor lasers 5, being coupled optically with the single-mode waveguide array 3. This embodiment can also be used as optical multiplexer and also as optical demultiplexer. In case the device of this embodiment is used as optical demultiplexer, a multi-mode waveguide array or a waveguide array made up of multi-mode waveguides and single-mode waveguides can be used in place of the single-mode waveguide array 9.

Figure 7:
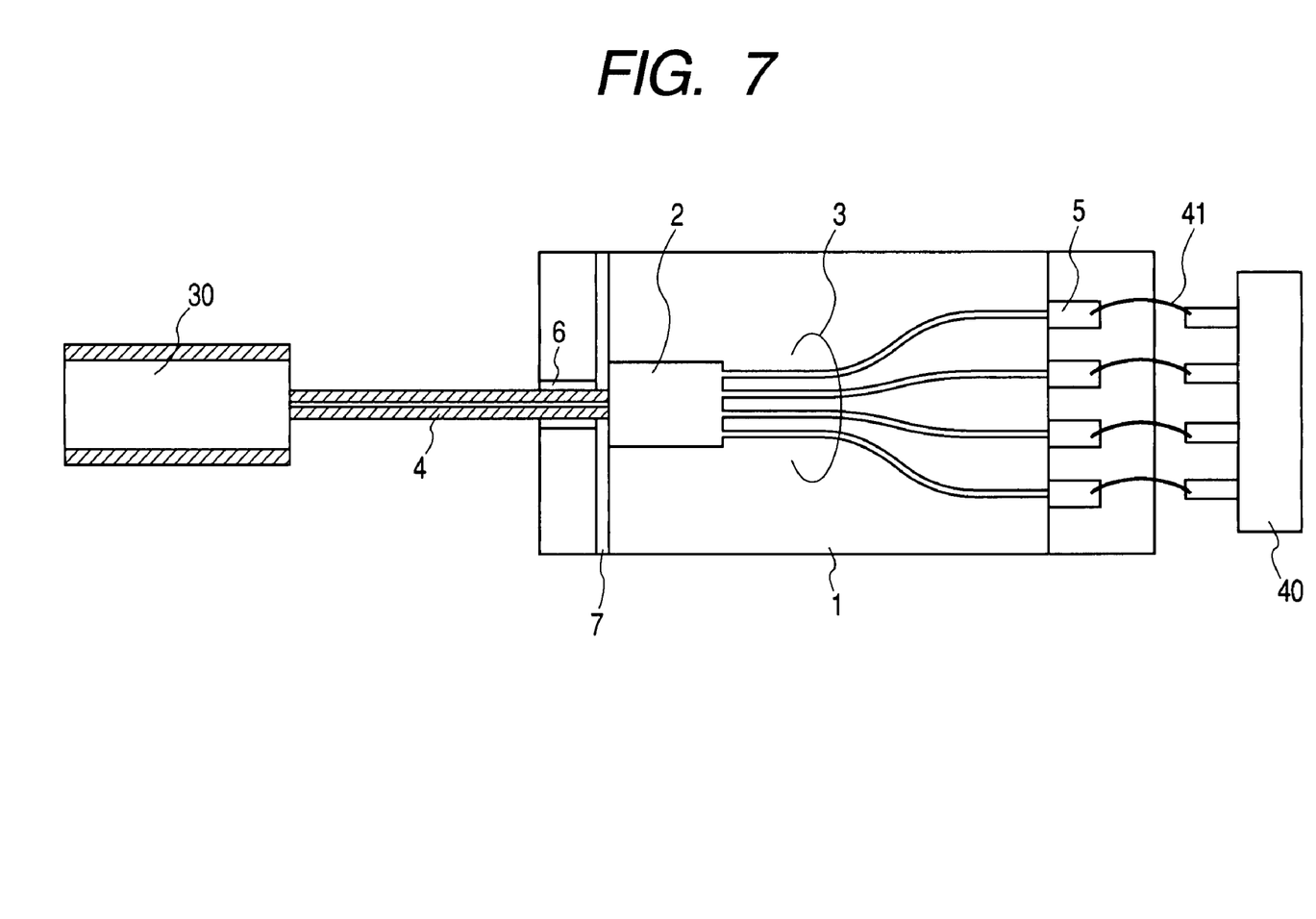
FIG. 7 is a plan view showing a fifth embodiment of this invention.

FIG. 7 shows the fifth embodiment of this invention. This embodiment is an example of optical multiplexer. This embodiment is derived from the optical module of the second embodiment, with the single-mode fiber 4 having its end face, which does not couple with the multi-mode waveguide 2, coupled to a multi-mode fiber 30. This arrangement enables the single mode from the single-mode fiber 4 to be incident to the center of the multi-mode fiber 30, whereby the waveguide mode can be roused efficiently in the multi-mode fiber 30. The rest is identical to the embodiment of FIG. 2. As shown in this embodiment, this invention can be used effectively for optical transmission through a multi-mode fiber.

Figure 8:
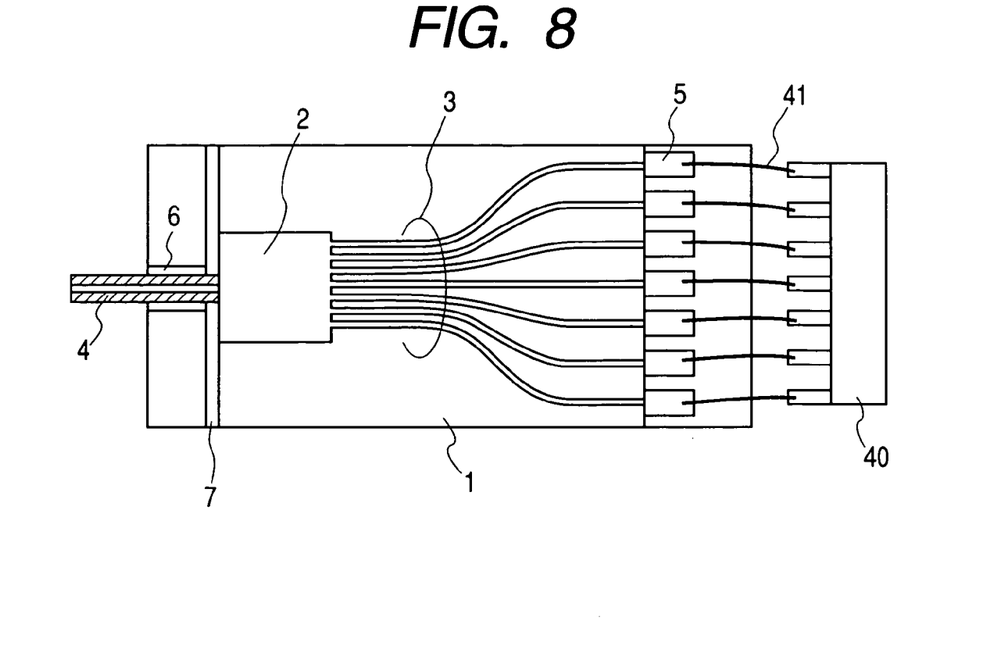
FIG. 8 is a plan view showing a sixth embodiment of this invention.

The inventive device can have an arbitrary number of single-mode waveguides of the single-mode waveguide array 3, instead of being confined to four waveguides which have been shown in the figures for the explanation of the preceding embodiments. FIG. 8 shows, as the sixth embodiment, an example of module having seven single-mode waveguides.

Figure 9:
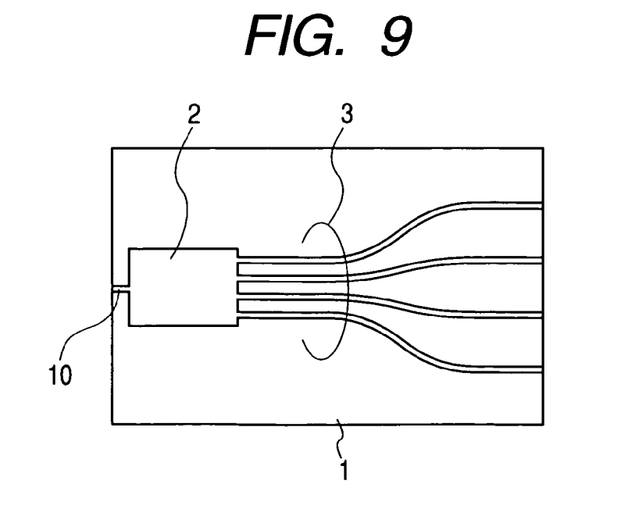
FIG. 9 is a plan view showing a seventh embodiment of this invention.

The inventive device may be provided, between the multi-mode waveguide 2 and the single-mode fiber 4, with a single-mode waveguide 10 having a finite length around 0 µm. FIG. 9 shows, as the seventh embodiment, an optical multiplexer/demultiplexer having such a structure. This embodiment can also have large tolerance of setup positioning error as explained above. The above-mentioned "a finite length around 0 µm" for the length of the single-mode waveguide 10 is more specifically as explained in detail in the section entitled Disclosure of the Invention. The allowable range of the length has been explained in connection with FIG. 15.

The following configurations of optical waveguide member are practically useful. In one case, the single-mode waveguide in optical coupling with the second end face of the multi-mode waveguide has a center value of the allowable range of length set equal to a value which is the value of π divided by the difference of propagation constants between the 0th-order eigen mode and the radiative first-order mode of the single-mode waveguide. In another case, the single-mode waveguide in optical coupling with the second end face of the multi-mode waveguide has a center value of the allowable range of length set equal to a value which is the value of 2π divided by the difference of propagation constants between the 0th-order eigenmode and the radiative second-order mode of the single-mode waveguide. Optical modules using these optical waveguide members are useful.

It is desirable practically for these optical waveguide members to be configured such that the center axis of the multi-mode waveguide is coincident with the center axis of the single-mode waveguide which is coupled optically to the second end face of the multi-mode waveguide.

Figure 10:
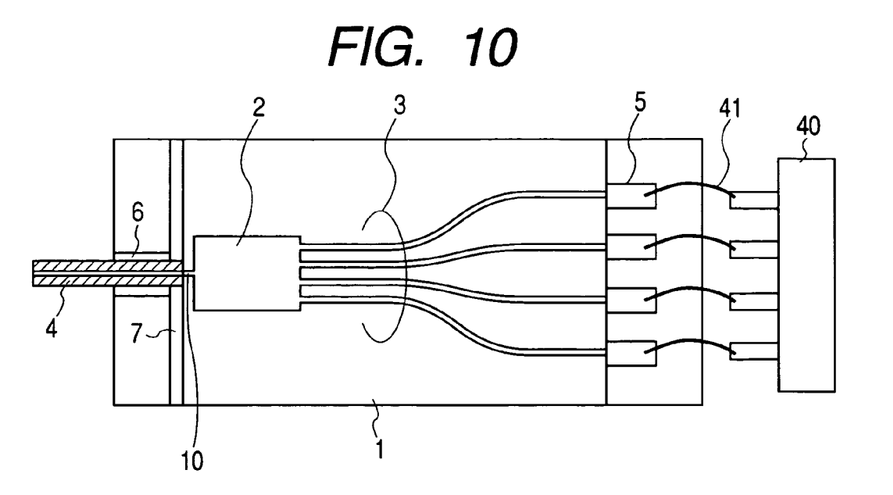
FIG. 10 is a plan view showing an eighth embodiment of this invention.

FIG. 10 shows the eighth embodiment of this invention. This embodiment is an example of transmission module or reception module based on the device of the previous seventh embodiment. With the single-mode waveguide array 3 being coupled with single-mode fibers or single-mode waveguides in place of optical elements, the module can be operative as optical multiplexer/demultiplexer.

Figure 11:
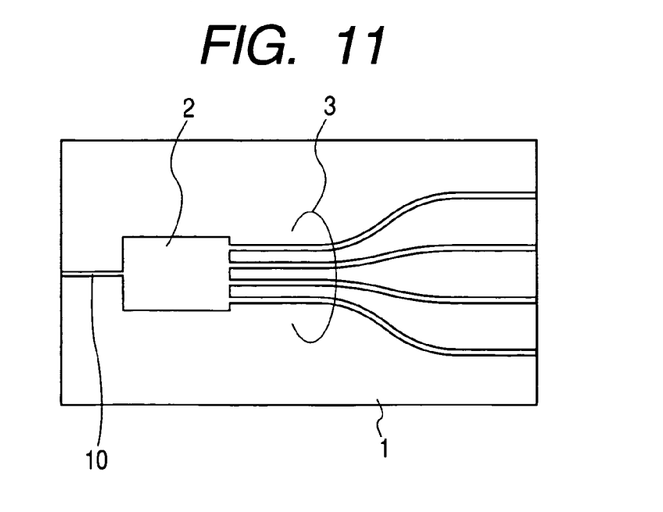
FIG. 11 is a plan view showing a ninth embodiment of this invention.

The inventive device may be provided, between the multi-mode waveguide 2 and the single-mode fiber 4, with a single-mode waveguide 10 having its length set to be equal or approximately equal to the period of interference between the 0th-order mode and a radiative higher-order mode. FIG. 11 shows the ninth embodiment having this structure. This case also can have large tolerance of setup positioning error as explained above. The specific length of the single-mode waveguide 10 is as explained in detail in the section entitled Disclosure of the Invention.

Figure 12:
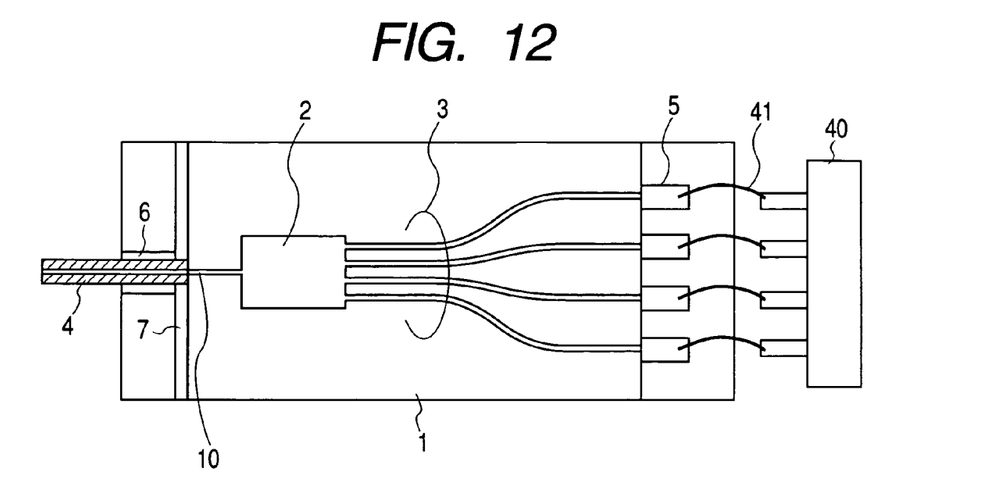
FIG. 12 is a plan view showing a tenth embodiment of this invention.

FIG. 12 shows the tenth embodiment of this invention. This embodiment is an example of transmission module or reception module based on the device of the previous ninth embodiment.

With the single-mode waveguide array 3 being coupled with single-mode fibers or single-mode waveguides in place of optical elements, the module can be operative as optical multiplexer/demultiplexer.

This invention is effective regardless of the materials of the substrate, waveguides and other constituents, and is not confined to the cases explained in the foregoing embodiments. In addition, this invention is effective regardless of the positioning and fixing manners of the single-mode fiber, optical elements, waveguides, and other constituents, and is not confined to the cases explained in the foregoing embodiments.

The following itemizes various cases of the length of the single-mode optical waveguide which is coupled optically to the second end face of the multi-mode waveguide. Cases represented solely in terms of specific numerals, such as 20 µm or less, or 40 µm or less, are excluded.

(1) In an optical waveguide member including a multi-mode optical waveguide, a plurality of first single-mode optical waveguides which are coupled optically to a first end face of the multi-mode optical waveguide, and at least one second single-mode waveguide which is coupled optically to a second end face, which is opposite to the first end face, of the multi-mode optical waveguide, the second single-mode optical waveguide has a length which is at least in any of a range (positive number) from n−⅕ fold to n+⅕ fold values (where n=0,1,2, . . . ) of the period of interference between the 0th-order eigenmode and a radiative higher-order mode of the second single-mode waveguide, a range (positive number) from n−⅕ fold to n+⅕ fold values (where n=0,1,2, . . . ) of a value which is the value of π divided by the difference of propagation constants between the 0th-order eigen mode and a radiative higher-order mode of the second single-mode waveguide, and a range (positive number) from n−⅕ fold to n+⅕ fold values (where n=0, 1,2, . . . ) of a value which is the value of 2π divided by the difference of propagation constants between the 0th-order eigen mode and a radiative higher-order mode of the second single-mode waveguide.

(2) In an optical waveguide member set forth in item (1), the above-said single-mode waveguide which is coupled optically to the second end face of the multi-mode waveguide has a length which ranges (positive number) from n−¹⁄₁₀ fold to n+¹⁄₁₀ fold values (where n=0, 1, 2, . . . ) of the period of interference between the 0th-order eigen mode and a radiative higher-order mode of the above-said single-mode waveguide.

(3) In an optical waveguide member including, at least, a multi-mode optical waveguide, a plurality of single-mode optical waveguides which are coupled optically to a first end face of the multi-mode optical waveguide, a single-mode optical waveguide which is coupled optically to a second end face, which is opposite to the first end face, of the multi-mode optical waveguide, and a single-mode fiber which is coupled optically to a second end face, which is opposite to a first end face coupled to the multi-mode optical waveguide, of the single-mode optical waveguide, the above-said single-mode optical waveguide has a length which ranges (positive number) from an n-fold value (where n=0, 1, 2, . . . ) of the period of interference between the 0th-order eigen mode and a radiative higher-order mode of the above-said single-mode waveguide to ±40 µm.

(4) In an optical waveguide member set forth in item (4) the above-said single-mode waveguide which is coupled optically to the second end face of the multi-mode waveguide has a length which ranges (positive number) from an n-fold value (where n=0,1,2, . . . ) of the period of interference between the 0th-order eigen mode and a radiative higher-order mode of the above-said single-mode waveguide to ±20 µm.

(5) In an optical waveguide member including, at least, a multi-mode optical waveguide, a plurality of single-mode optical waveguides which are coupled optically to a first end face of the multi-mode optical waveguide, a single-mode waveguide which is coupled optically to a second end face, which is opposite to the first end face, of the multi-mode optical waveguide, and a single-mode fiber which is coupled optically to a second end face, which is opposite to a first end face coupled to the multi-mode optical waveguide, of the single-mode optical waveguide, the above-said single-mode optical waveguide has a length which ranges (positive number) from n−⅕ fold to n+⅕ fold values (where n=0,1,2, . . . ) of a value which is the value of π divided by the difference of propagation constants between the 0th-order eigenmode and a radiative higher-order mode of the above-said single-mode waveguide.

(6) In an optical waveguide member set forth in item (5) the above-said single-mode waveguide which is coupled optically to the second end face of the multi-mode waveguide has a length which ranges (positive number) from n−⅒ fold to n+⅒ fold values (where n=0,1,2, . . . ) of a value which is the value of π divided by the difference of propagation constants between the 0th-order eigenmode and a radiative higher-order mode of the above-said single-mode waveguide.

(7) In an optical waveguide member including, at least, a multi-mode optical waveguide, a plurality of single-mode optical waveguides which are coupled optically to a first end face of the multi-mode optical waveguide, and a second single-mode waveguide which is coupled optically to a second end face, which is opposite to the first end face, of the multi-mode optical waveguide, the above-said single-mode optical waveguide is adapted to couple optically on its second end face, which is opposite to the first end face in coupling with the multi-mode optical waveguide, with a single-mode fiber, and the above-said single-mode optical waveguide has a length which ranges (positive number) from a value which is the value of π divided by the difference of propagation constants between the 0th-order eigenmode and a radiative higher-order mode of the above-said single-mode waveguide to ±40 µm.

(8) In an optical waveguide member, the above-said single-mode waveguide which is coupled optically to the second end face of the multi-mode waveguide has a length which ranges (positive number) from a value which is the value of π divided by the difference of propagation constants between the 0th-order eigenmode and a radiative higher-order mode of the above-said single-mode waveguide to ±20 µm.

(9) In an optical waveguide member including, at least, a multi-mode optical waveguide, a plurality of single-mode optical waveguides which are coupled optically to a first end face of the multi-mode optical waveguide, and a single-mode waveguide which is coupled optically to a second end face, which is opposite to the first end face, of the multi-mode optical waveguide, the above-said single-mode optical waveguide is adapted to couple optically on its second end face, which is opposite to the first end face in coupling with the multi-mode optical waveguide, with a single-mode fiber, and the above-said single-mode optical waveguide has a length which ranges (positive number) from n−⅕ fold to n+⅕ fold values (where n=0, 1,2, . . . ) of a value which is the value of 2π divided by the difference of propagation constants between the 0th-order eigenmode and a radiative higher-order mode of the above-said single-mode waveguide.

(10) In an optical waveguide member, the above-said single-mode waveguide which is coupled optically to the second end face of the multi-mode waveguide has a length which ranges (positive number) from n−⅒ fold to n+⅒ fold values (where n=0,1,2, . . . ) of a value which is the value of 2π divided by the propagation constants between the 0th-order eigenmode and a radiative higher-order mode of the above-said single-mode waveguide.

(11) In an optical waveguide member including, at least, a multi-mode optical waveguide, a plurality of single-mode optical waveguides which are coupled optically to a first end face of the multi-mode optical waveguide, and a single-mode waveguide which is coupled optically to a second end face, which is opposite to the first end face, of the multi-mode optical waveguide, the above-said single-mode optical waveguide is adapted to couple optically on its second end face, which is opposite to the first end face in coupling with the multi-mode optical waveguide, with a single-mode fiber, and the above-said single-mode optical waveguide has a length which ranges (positive number) from a value which is the value of 2π divided by the difference of propagation constants between the 0th-order eigenmode and a radiative higher-order mode of the above-said single-mode waveguide to ±40 µm.

(12) In an optical waveguide member set forth in item (11) the above-said single-mode waveguide which is coupled optically to the second end of the multi-mode waveguide has a length which ranges (positive number) from a value which is the value of 2π divided by the difference of propagation constants between the 0th-order eigenmode and a radiative higher-order mode of the above-said single-mode waveguide to ±20 µm.

The following itemizes practical configurations of the inventive optical waveguide member.

Firstly, the inventive optical waveguide member is characterized by having at least one of its multi-mode waveguide and single-mode waveguide formed of a material of polymer.

Secondly, the inventive optical waveguide member is characterized by having at least one of its multi-mode waveguide and single-mode waveguide formed on a silicon substrate.

Thirdly, the inventive optical waveguide member is characterized by having its single-mode optical waveguide coupled optically on one end face thereof, which is different from another end face in coupling with the multi-mode waveguide, with a single-mode fiber.

Fourthly, the single-mode fiber is fixed by means of a V-shape groove or a groove of other cross-sectional shape formed in the substrate which is shared with the multi-mode waveguide or single-mode waveguides.

Fifthly, the inventive optical waveguide member is characterized in that the single-mode fiber is coupled optically on its end face, which does not couple optically with neither the single-mode waveguide nor the multi-mode waveguide, with a multi-mode fiber. It is desirable that the technical concept of the invention be applied to the third and fourth items.

The following itemizes examples of optical module of this patent application.

A first configuration of optical module comprises at least one optical multiplexer or optical demultiplexer of this invention, and is characterized in that at least one of the single-mode waveguides, which are coupled optically to a first end face of the multi-mode waveguide included in the optical multiplexer or optical demultiplexer, is coupled optically on its end face, which does not couple optically with the multi-mode waveguide, with a single-mode fiber or multi-mode fiber.

A second configuration of optical module is derived from the first configuration, and is characterized in that the single-mode fiber or multi-mode fiber, which is coupled optically to the single-mode waveguide in optical coupling with the first end face of the multi-mode waveguide, is fixed by means of a V-shape groove or a groove of other cross-sectional shape formed in the substrate which is shared with the multi-mode waveguide or single-mode waveguides.

A third configuration of optical module is derived from the first configuration, and is characterized in that semiconductor lasers of the distribution feedback type or distribution reflection type having different oscillation wavelengths are coupled optically to the single-mode waveguides which are coupled optically to the first end face of the multi-mode waveguide of the optical multiplexer.

A fourth configuration of optical module is derived from the first configuration, and is characterized in that photodiodes of the waveguide type are coupled optically to the single-mode waveguides which are coupled optically to the first end face of the multi-mode waveguide of the optical demultiplexer.

Using the inventive optical waveguide members and elements enables the setup of module based on the inexpensive passive alignment scheme, whereby a low-cost optical module can be accomplished.

According to the embodiments of this invention, there are provided optical waveguide members, e.g., optical multiplexer/demultiplexer, having large tolerance of setup positioning error.

CAPABILITY OF INDUSTRIAL APPLICATION

This invention resides in an optical waveguide member which is characterized by including a multi-mode optical waveguide and a plurality of first single-mode optical waveguides which are coupled optically to a first end face of the multi-mode optical waveguide, with the multi-mode waveguide being adapted to couple optically on its second end face, which is opposite to the first end face, with a single-mode fiber, and the invention can provide optical waveguide members, e.g., optical multiplexer/demultiplexer, having large tolerance of setup positioning error.

The invention claimed is:

1. An optical waveguide member comprising:
a multi-mode optical waveguide which is surrounded on a core exterior thereof by a clad, and
a plurality of first single-mode optical waveguides which are coupled optically to a first end face of said multi-mode optical waveguide, said multi-mode optical waveguide being a multi-mode optical waveguide having a multi-mode interference effect, which performs optical multiplexing and optical demultiplexing in accordance with the multi-mode interference effect, and which is structured to directly couple optically on a second end face thereof, which is opposite to the first end face, with a single-core single-mode fiber;
wherein at a position contiguous to the second end face of said multi-mode optical waveguide, a groove structure for holding an optical fiber to be coupled optically to the second end face of said multi-mode optical waveguide is set.

2. An optical waveguide member comprising:
a multi-mode optical waveguide which is surrounded on a core exterior thereof by a clad, and
a plurality of first single-mode optical waveguides which are coupled optically to a first end face of said multi-mode optical waveguide, said multi-mode optical waveguide being a multi-mode optical waveguide having a multi-mode interference effect, which performs optical multiplexing and optical demultiplexing in accordance with the multi-mode interference effect, and which is structured to directly couple optically on a second end face thereof, which is opposite to the first end face, with a single-core single-mode fiber; and
at least, a single-core single-mode fiber which is directly coupled optically to the second end face, which is opposite to the first end face, of said multi-mode optical waveguide; and
wherein at a position contiguous to the second end face of said multi-mode optical waveguide, a groove structure for holding an optical fiber to be coupled optically to the second end face of said multi-mode optical waveguide is set, including a single-mode fiber which is coupled optically to the second end face of said multi-mode optical waveguide, and having said single-mode fiber held by means of said groove structure.

3. An optical waveguide member set forth in claim 1, wherein at least one of said multi-mode optical waveguide and said first single-mode optical waveguides is formed of a material of polymer resin.

4. An optical waveguide member set forth in claim 2, wherein at least one of said multi-mode optical waveguide and said first single-mode optical waveguides is formed of a material of polymer resin.

5. An optical waveguide member set forth in claim 1, wherein at least one of said multi-mode optical waveguide and said first single-mode optical waveguides is formed on a silicon substrate.

6. An optical waveguide member set forth in claim 2, wherein at least one of said multi-mode optical waveguide and said first single-mode optical waveguides is formed on a silicon substrate.

7. An optical waveguide member comprising:
a multi-mode optical waveguide, said multi-mode optical waveguide performing optical multiplexing/demultiplexing by using multi-mode interference,
a plurality of first single-mode optical waveguides which are coupled optically to a first end face of said multi-mode optical waveguide, and
at least one second single-mode optical waveguide which is coupled optically to a second end face, which is opposite to the first end face, of said multi-mode optical waveguide, said second single-mode waveguide having a length of 40 µm or less.

8. An optical waveguide member set forth in claim 7, wherein said at least one second single-mode optical waveguide has third and fourth end faces, the third end face of said second single-mode optical waveguide being coupled optically to the second end face of said multi-mode optical waveguide, said member including a single-mode fiber which is coupled optically to the fourth end face which is opposite to the third end face in coupling with said multi-mode optical waveguide.

9. An optical waveguide member set forth in claim 7, wherein said at least one second single-mode optical waveguide has third and fourth end faces, the third end face of said second single-mode optical waveguide being coupled optically to the second end face of said multi-mode optical waveguide, said at least one second single-mode optical waveguide having a length of 20 µm or less.

10. An optical waveguide member set forth in claim 9, wherein a single-mode fiber is coupled optically to said fourth end face of said at least one second single-mode optical waveguide.

11. An optical waveguide member set forth in claim 7, wherein said at least one second single-mode optical waveguide has third and fourth end faces, said third end face of said second single-mode optical waveguide being coupled optically to the second end face of said multi-mode optical waveguide, and at a position contiguous to said fourth end face of said second single-mode optical waveguide, a groove structure for holding an optical fiber to be coupled optically to the fourth end face is set.

12. An optical waveguide member set forth in claim 8, wherein at a position contiguous to said fourth end face of said second single-mode optical waveguide, a groove structure for holding an optical fiber to be coupled optically to the fourth end face is set, and having a single-mode fiber which is coupled optically to the fourth end face of said multi-mode optical waveguide, and said single-mode fiber is held by means of said groove structure.

13. An optical waveguide member set forth in claim 9, wherein at a position contiguous to said fourth end face of said second single-mode optical waveguide, a groove structure for holding an optical fiber to be coupled optically to the fourth end face is set.

14. An optical waveguide member set forth in claim 7, wherein at least one of said multi-mode optical waveguide and said first and second single-mode optical waveguides is formed of a material of polymer resin.

15. An optical waveguide member set forth in claim 7, wherein at least one of said multi-mode optical waveguide and said first and second single-mode optical waveguides is formed on a silicon substrate.

16. An optical waveguide member comprising: a multi-mode optical waveguide, a plurality of first single-mode optical waveguides which are coupled optically to a first end face of said multi-mode optical waveguide, and at least one second single-mode optical waveguide which is coupled optically to a second end face, which is opposite to the first end face, of said multi-mode optical waveguide,
wherein said second single-mode waveguide has a length which is at least in any of a range (positive number) from n−1/5 fold to n+1/5 fold values (where n=0, 1, 2, . . . ) of a period of interference between a 0th-order eigenmode and a radiative higher-order mode of said second single-mode waveguide, a range (positive number) from n−1/5 fold to n+1/5 fold values (where n=0, 1, 2, . . . ) of a value which is the value of $\pi$ divided by a difference of propagation constants between the 0th-order eigenmode and a radiative higher-order mode of said second single-mode waveguide, and a range (positive number) from n−1/5 fold to n+1/5 fold values (where n=0, 1, 2, . . . ) of a value which is the value of $2\pi$ divided by the difference of propagation constants between the 0th-order eigenmode and a radiative higher-order mode of said second single-mode waveguide.

17. An optical waveguide member set forth in claim 16, wherein said at least one second single-mode optical waveguide has a third and fourth end faces, the third end face of said second single-mode optical waveguide being coupled optically to the second end face of said multi-mode optical waveguide, said optical waveguide member including a single-mode fiber which is coupled optically to the fourth end face, which is opposite to the second end face in coupling with said multi-mode optical waveguide, of said single-mode optical waveguide.

18. An optical module comprising:
at least one of the optical waveguide member set forth in claim 1, said at least one of the optical waveguide member having at least one of a plurality of first single-mode optical waveguides which are coupled optically to the first end face of the multi-mode optical waveguide included in said optical waveguide member, and
at least one member selected from a group of an optical element, an optical waveguide, a single-mode fiber, a multi-mode fiber and a groove structure for holding an optical fiber, on one end face, which does not couple optically with said multi-mode optical waveguide, of at least one of a plurality of the first single-mode optical waveguides.

19. An optical waveguide member comprising:
a multi-mode optical waveguide,
a plurality of first single-mode optical waveguides which are coupled optically to a first end face of said multi-mode optical waveguide, and
at least one second single-mode optical waveguide which is coupled optically to a second end face, which is opposite to the first end face, of said multi-mode optical waveguide, wherein
said second single-mode waveguide has a length which is in a range (positive number) from an n-fold value (where n=0, 1, 2, . . . ) of a period of interference between a 0th-order eigenmode and a radiative higher-order mode of the above-said single-mode waveguide to ±40 µm.

20. An optical waveguide member comprising:
a multi-mode optical waveguide,
a plurality of first single-mode optical waveguides which are coupled optically to a first end face of said multi-mode optical waveguide, and
at least one second single-mode optical waveguide which is coupled optically to a second end face, which is opposite to the first end face, of said multi-mode optical waveguide, wherein
said second single-mode waveguide has a length which is in a range (positive number) from an n-fold value (where n=0, 1, 2, . . . ) which is a value of $\pi$ divided by a difference of propagation constants between a 0th-order eigenmode and a radiative higher-order mode of the above-said single-mode waveguide to ±40 µm, or in a range (positive number) from an n-fold value (where n=0,1,2, . . .) which is a value of $2\pi$ divided by a difference of propagation constants between the 0th-order eigenmode and a radiative higher-order mode of the above-said single-mode waveguide to ±40 µm.

* * * * *